(12) United States Patent
Newman et al.

(10) Patent No.: US 7,664,159 B2
(45) Date of Patent: Feb. 16, 2010

(54) THERMAL DISTORTION COMPENSATION FOR LASER MIRRORS

(75) Inventors: Leon A. Newman, Glastonbury, CT (US); Vernon A. Seguin, Windsor, CT (US); Lanny Laughman, Bolton, CT (US); Adrian Papanide, Sheldon, CT (US)

(73) Assignee: Coherent, Inc., Santa Clara, CA (US)

( * ) Notice: Subject to any disclaimer, the term of this patent is extended or adjusted under 35 U.S.C. 154(b) by 30 days.

(21) Appl. No.: 12/168,376

(22) Filed: Jul. 7, 2008

(65) Prior Publication Data

US 2009/0034577 A1 Feb. 5, 2009

Related U.S. Application Data

(60) Provisional application No. 60/962,740, filed on Jul. 31, 2007.

(51) Int. Cl.
*H01S 3/08* (2006.01)
*G02B 5/08* (2006.01)
*G02B 7/182* (2006.01)

(52) U.S. Cl. .................. 372/107; 372/55; 359/838; 359/871; 359/872

(58) Field of Classification Search ............ 372/55–57, 372/107; 359/838, 869, 871–872
See application file for complete search history.

(56) References Cited

U.S. PATENT DOCUMENTS

| 3,564,452 A | 2/1971 | Rempel | 331/94.5 |
| 3,609,589 A | 9/1971 | Hufnagel | 331/94.5 |
| 3,836,236 A * | 9/1974 | Kirk et al. | 359/845 |
| 3,841,737 A | 10/1974 | Rambauske et al. | 350/288 |
| 4,074,416 A | 2/1978 | Rambauske et al. | 29/527.4 |
| 4,253,739 A | 3/1981 | Carlson | 350/310 |
| 4,287,421 A | 9/1981 | DeBaryshe et al. | 250/423 P |
| 4,719,639 A | 1/1988 | Tulip | 372/66 |
| 5,020,895 A * | 6/1991 | Giesen et al. | 359/845 |
| 5,048,048 A | 9/1991 | Nishimae et al. | 372/95 |

(Continued)

FOREIGN PATENT DOCUMENTS

SU 1597834 A1 10/1990

OTHER PUBLICATIONS

U.S. Appl. No. 12/079,296, filed Mar. 26, 2008, by Leon A. Newman et al., entitled "RF Excited $CO_2$ Slab Laser Tube Housing and Electrodes Cooling," 28 pages in length.

(Continued)

*Primary Examiner*—Minsun Harvey
*Assistant Examiner*—Phillip Nguyen
(74) *Attorney, Agent, or Firm*—Morrison & Foerster LLP

(57) ABSTRACT

A laser mirror assembly is disclosed with improved pointing stability. An elongated mirror includes a concave reflecting portion. A pair of elongated planar portions extend parallel to the concave reflecting portion on either side thereof. The planar portions are stepped down from the reflecting portion. The mirror is formed from copper. A pair of stainless steel strips are connected to planar portions. The bimetallic effect between the copper mirror and the stainless steel strips operates to counteract the warping of the mirror due to differential heating effects which arise during operation. In an alternate embodiment, a pair of aluminum strips are mounted on the rear surface of the mirror.

20 Claims, 9 Drawing Sheets

U.S. PATENT DOCUMENTS

| | | | | |
|---|---|---|---|---|
| 5,123,028 A | * | 6/1992 | Hobart et al. | 372/95 |
| 5,140,606 A | | 8/1992 | Yarborough et al. | 372/64 |
| 5,335,242 A | * | 8/1994 | Hobart et al. | 372/95 |
| 5,751,750 A | | 5/1998 | Friede et al. | 372/34 |
| 5,801,891 A | * | 9/1998 | Lloyd | 359/871 |
| 6,986,585 B1 | | 1/2006 | Neil et al. | 359/845 |
| 7,346,093 B2 | * | 3/2008 | Sandstrom et al. | 372/107 |

OTHER PUBLICATIONS

U.S. Appl. No. 60/962,555, filed Jul. 30, 2007, by Christian J. Shackleton et al., entitled "Ceramic Enclosed Slab Laser Discharge with a Stand-Off Distance Between the Ceramic Strips and the Discharge," 11 pages in length.

* cited by examiner

THERMAL DISTORTION COMPENSATION FOR LASER MIRRORS

PRIORITY

This application claims priority to U.S. Provisional Application Ser. No. 60/962,740 filed Jul. 31, 2007, the disclosure of which is incorporated herein by reference.

TECHNICAL FIELD

This invention relates to high power carbon dioxide slab lasers. More specifically, the invention relates to a design of a mirror system which reduces thermal distortion and improves pointing stability.

BACKGROUND

The subject invention relates to high power diffusion cooled carbon dioxide slab lasers. An example of such a laser can be found in commonly owned U.S. Pat. No. 5,140,606 incorporated herein by reference. These lasers include a pair of rectangular metal electrodes mounted within a sealed housing containing the laser gas. The electrodes are spaced closely together to define a slab shaped discharge region. RF power is used to excite the gas to generate laser light.

These types of lasers typically use a hybrid optical resonator which has an unstable resonator in the width dimension of the parallel facing electrodes and a waveguide type resonator in the vertical (i.e., the "gap") dimension separating the two electrodes. Early designs used a positive branch unstable resonator (see, for example, U.S. Pat. No. 4,719,639, incorporated herein by reference). Later designs have used a negative branch unstable resonator (see U.S. Pat. No. 5,048,048).

The positive branch unstable resonator designs are about an order of magnitude more difficult to align than the negative branch designs but the designs are much less sensitive to output beam pointing variations as a function of changes in the curvature of the resonators mirrors with temperature changes. On the other hand the negative branch resonators are easier to align but their beam pointing variations are much more sensitive to mirror curvature changes with temperature. The variation in the mirror curvature with temperature causes the pointing of the output laser beam to vary.

To obtain the easier to align advantages of the negative branch unstable resonators, the large changes in the lasers beam pointing stability with changes in mirror curvature with temperature needs to be solved. This is especially true as the discharge length becomes shorter and the width increases. Analysis indicates that the pointing variations of the laser beam increase directly with the width of the negative branch unstable resonator and inversely as the square of its length. Designing shorter industrial CO2 laser is looked upon with favor in the industrial application of CO2 lasers as long as beam quality is not compromised. In this regard, as the length of the discharge is made shorter, the width of the discharge needs to be increased to maintain the same discharge area required to obtain the same laser output power.

In a negative branch unstable resonator design, the output coupling mirror and the return mirror have concave surfaces. The mirrors normally extend over the entire width of the parallel facing electrodes that are separated by a small gap in the vertical dimension except at the output coupling side. Direct thermal heating of the mirror's reflecting surface by the laser beam occurs because the high reflecting thin films deposited on the mirror's surface have a very small but finite absorption which heats the surface of the mirror. The heat from this reflecting surface propagates through the thickness of the mirror, thereby, establishing a temperature gradient between the front and back surfaces of the mirror.

Since the back of the mirror is normally attached to a massive mechanical housing holding the mirror, the back of the mirror is usually cooler then the front surface, thus maintaining a temperature gradient between the front and back surfaces. This temperature gradient increases with laser power and causes a distortion or warping of the mirror's surface thereby disturbing the optical resonator's geometry resulting in undesirable changes in the laser's output beam performance such as in beam profile shapes and in pointing variations. In the case of a thermal gradient, the warping causes the concave mirror surface (the side towards the laser discharge) to become more convex.

Changes in output beam parameters in response to changes in operating conditions of the laser, such as RF power input to the discharge, pulse repetition frequency, duty cycle, etc., cause changes in the mirror thermal gradient and such changes are not desirable in industrial laser systems. The elimination or reduction of these laser mirror thermal distortion effects is highly desirable and is the focus of this disclosure. It is important to note that this invention has broader applications then to only reducing the pointing variations of an unstable laser resonator output beam. For example, it can have relevance to reducing mirror distortions in optical systems handling high optical power.

Our analytical analysis and experimental testing have indicated that the major cause of beam pointing variations in a slab CO2 laser's output that utilizes a negative branch unstable resonator is changes in the curvature of the surfaces of the high reflecting feedback mirror and of the output coupling mirror of the unstable resonators. This change in curvature is caused by the three thermal effects listed below:

1. A temperature gradient across the thickness of the mirror causes bending of the mirrors. Since the back of the mirror is cooler than the reflecting surface of the mirror, the mirror becomes less concave due to the fact that the front surface expands more the back surface. We have found that a few degrees temperature gradient can make the laser's output beam deflect by an unacceptable amount.

2. An increase in the average temperature of the mirror by the heating of the mirror by the laser radiation also causes the mirror to become less concave due to the thermal expansion of the mirror's material. Changes in the mirror's curvature changes the optimum alignment of the resonator and deteriorates the laser's performance. In our case, the mirror material is copper but similar changes in curvature effects can be expected with other mirror materials, such as Silicon, for example.

3. The bimetallic effect between the mirror material (usually copper) and the large mirror holder pate-form (usually made of aluminum) also changes the radius of curvature due to bending caused by the two materials having different thermal coefficient of expansion. It is important to note that the thermal coefficient of expansion of aluminum is larger than for copper. In this case, the bimetallic effect causes the concave mirror to become more concave.

The deleterious effects of mirror heating has been addressed in the prior art. For example, U.S. Pat. No. 5,020,895 describes using an adaptive optics technique to compensate for the thermal deformation of the mirrors. This approach involved the use of active electronic feedback circuitry coupled with a sensor and an actuator, such as a piezoelectric or a regulative liquid or gas pressure chamber, to provide a force to counteract the radius of curvature arising from the thermal effects on the mirror. This approach adds undesirable complexity and cost of the laser.

Another prior art technique was to use active electronic feedback circuitry coupled with a temperature sensor and a heating element to heat the back of the resonator's mirror to establish an appropriate temperature distribution to counteract the change in the radius of curvature (see U.S. Pat. No. 5,751,750). The latter patent also reported on an approach to couple out a small portion of the laser beam and use it to irradiate the back surface of the mirrors to equalize the temperature of the front and back surface of the mirrors. Both of these approaches add undesired complexity and cost to the lasers.

U.S. Pat. No. 4,287,421 discloses a transparent mirror material having reflective coatings pre-selected to allow a small amount of laser radiation to propagate through the coatings and the mirror material, to be in turn, absorbed by a coating on the back side of the mirror. The reflection and absorption parameters are selected so that radiation absorbed by the absorbing coating is sufficient to heat up the back side of the mirror to compensate for the temperature gradient between the front and back of the mirror. The limitation of this approach is the requirement for a transparent material for the mirror. Consequently, it is not useful with copper mirrors which we believe are more resistive to damage than either Si or ZnSe mirrors.

SUMMARY OF THE INVENTION

The subject invention addresses thermal mirror distortion using the bimetallic effect to improve rather than worsen mirror distortion. In a preferred embodiment, the end header assemblies of the laser housing are defined by a flange upon which is mounted a mirror support. An elongated mirror element is mounted to the support. The mirror element is formed from metal and includes a curved portion on the front surface thereof defining one of the reflecting surfaces of the resonator. The front surface further includes at least one and preferably two planar regions extending parallel to the curved portion of the mirror. These planar regions can be stepped down from the curved portion.

In accordance with the subject invention, metal strips are mounted onto the planar portions of the mirror element. These strips are formed from a material that has a lower coefficient of thermal expansion than the metal material of the mirror element. In the preferred embodiment, the mirror element is made of copper and the strips are made of stainless steel.

Because of the differential expansion rates of the two materials, the mirror and strips will exhibit the bimetallic effect. In this case, the bimetallic effect tends to cause the concave mirror to become more concave. In contrast, the differential heating tends to causes the mirror to become less concave. By proper selection of the thickness and size of the stainless steel strips, the two effects can be balanced, thus minimizing distortion.

In an alternate embodiment, one or more metal strips are mounted on the back of the mirror element. In this case, the coefficient of thermal expansion of the strips are selected to be greater than the coefficient of thermal expansion of the mirror element to counter the effects of the thermal gradient induced by heating the front surface of the mirror.

Further objects and advantages of the subject invention will become apparent from the following detailed description taken in conjunction with the drawings in which:

DETAILED DESCRIPTION OF THE PREFERRED EMBODIMENTS

Figure 1:
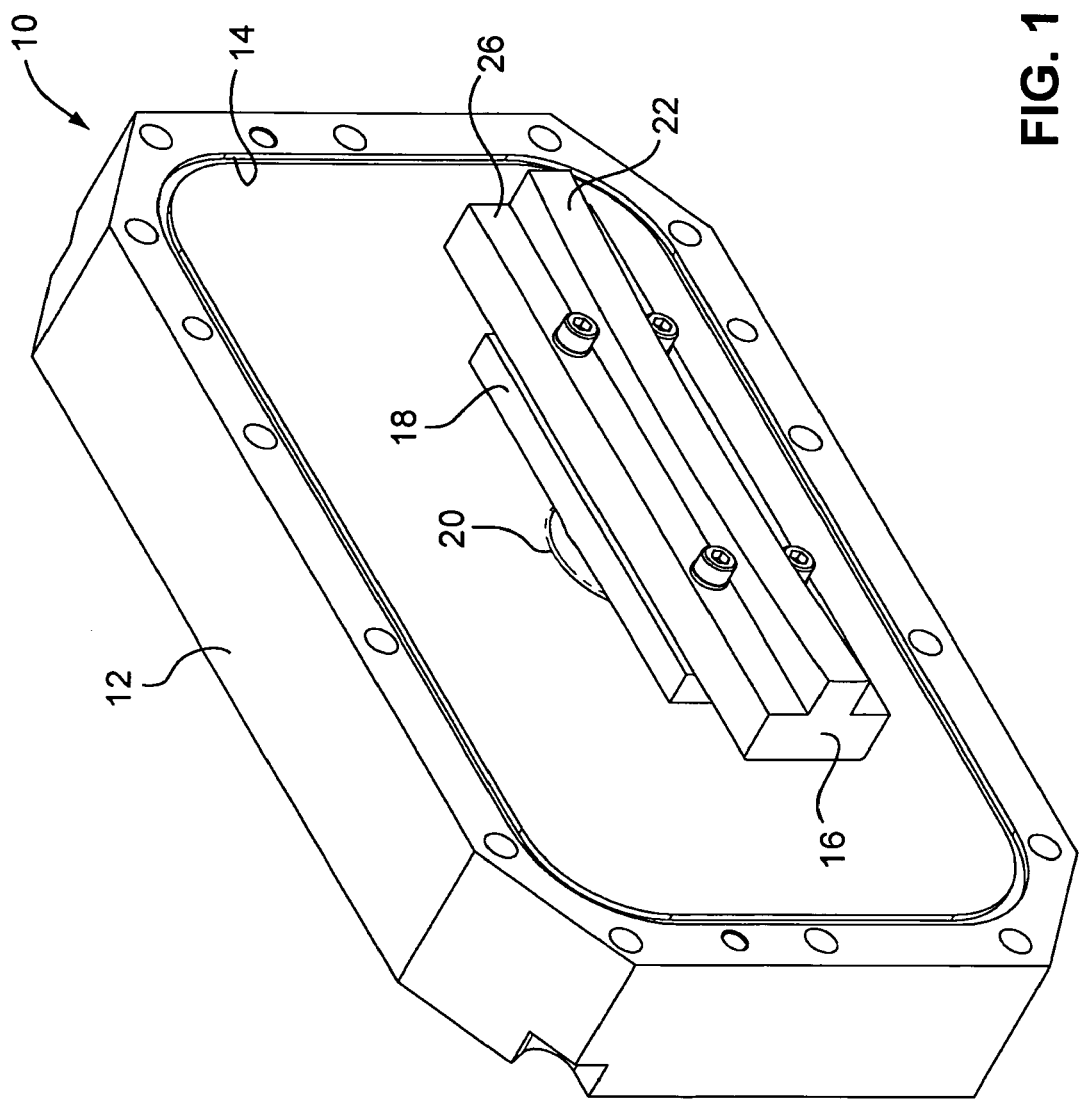
FIG. 1 is a perspective view of a header and mirror mount and mirror of the prior art showing the side facing the laser discharge.
Figure 2:
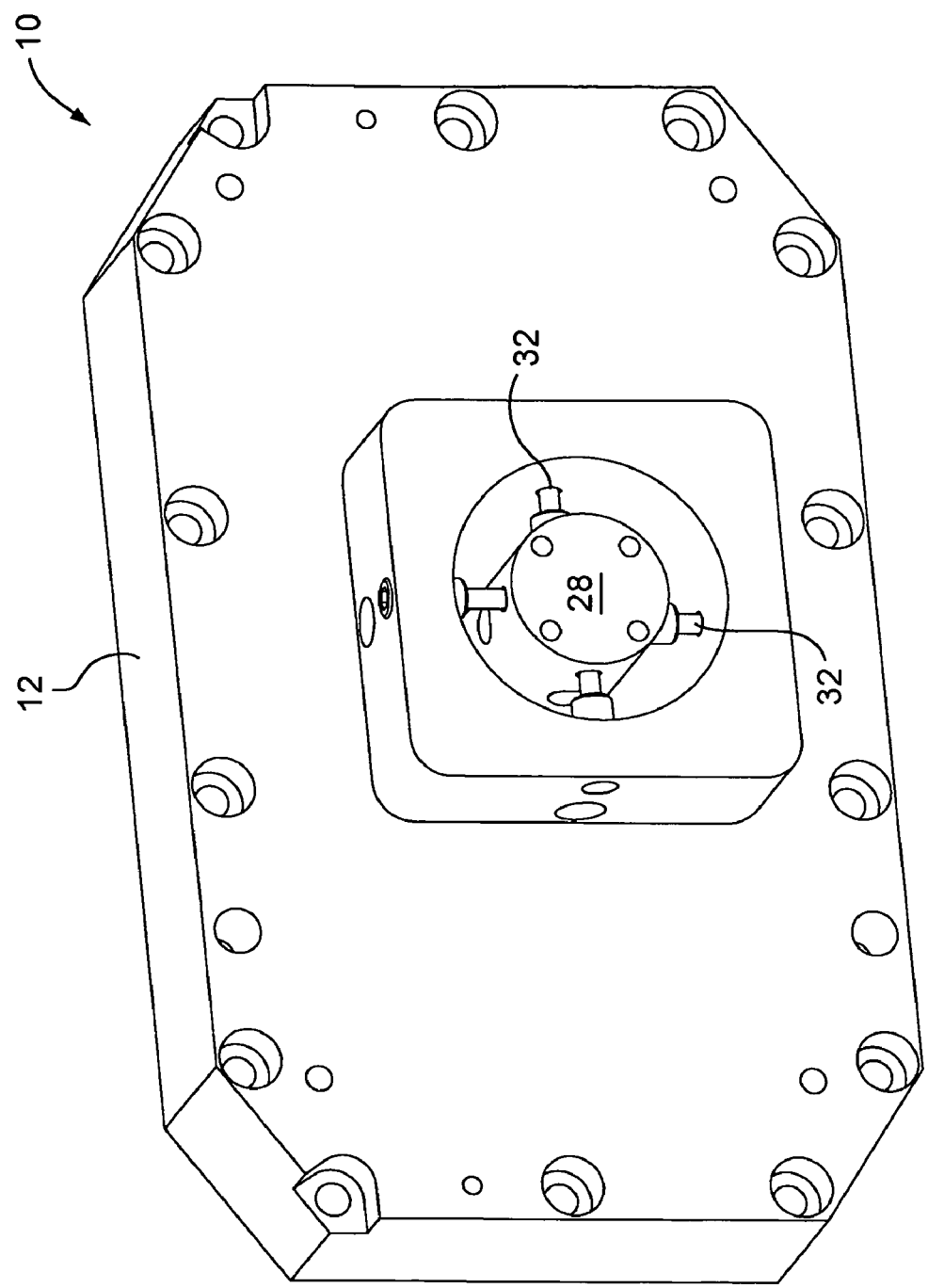
FIG. 2 a perspective view of the prior art header showing the side outside the laser chamber.

FIGS. 1 and 2 illustrate the header assembly 10 we have used in our experimental lasers for mounting a curved mirror forming a part of a negative branch unstable resonator of a $CO_2$ slab laser.

The header assembly includes an aluminum flange 12 which is bolted onto the main housing to hermetically seals the laser tube housing chamber containing the electrodes, the $CO_2$ gas mixture of $CO_2:N_2:H_e:X_e$, and the resonators mirrors. An O-ring 14 provides the hermetical seal. Commonly owned U.S. patent application Ser. No. 12/079,296 filed Mar. 26, 2008 (incorporated by reference) illustrates an example of a laser tube housing to which the flange disclosed herein can be attached. (See also U.S. Pat. No. 5,140,606 cited above).

A copper mirror 16 is mounted onto an aluminum mirror base 18 which in turn is connected to raised inside surface 20 of the aluminum flange. The mirror 16 includes an elongated, highly polished concave region 22 which defines the reflecting surface of the mirror. A pair of planar surfaces 26 are located on either side of the curved surface. The planar surfaces are stepped down from the curved surface so that the mirror has essentially a T-shape in cross-section.

The mounting of the copper mirror to the large aluminum base leads to a large bimetallic effect because of the large difference in thermal expansion coefficients of the materials. This bimetallic effect causes a large change in the curvature of the mirror that results in variations in the pointing direction of the laser beam with temperature.

The raised surface 20 of the flange has a two axis angular position adjustable post 28 machined into the back surface of the flange as illustrated in FIG. 2. This tiltable post 28 includes recessed front surfaces which maintain a hermetical seal by being an integral part of the end flange assembly by means of a thin web left during the machining process that connects the end of the adjustable post with the aluminum flange material (see U.S. Pat. No. 5,140,606 cited above). The four screws 32 illustrated in FIG. 2 are used to adjust the orientation of the mirror in two angular axis to align the laser's resonator cavity.

This mirror assembly structure shown in FIGS. 1 and 2 was used to form a negative branch hybrid unstable waveguide resonator for a 400 to 500 W $CO_2$ slab laser. The width of the electrodes were 3.780 inches. The radius of curvatures for the mirrors were approximately 0.6 m. (Further details of this test laser can be found in U.S. Provisional Application Ser. No. 60/962,555, filed Jul. 30, 2007 incorporated herein by reference.)

This prior art mirror assembly structure provided a laser output beam pointing variation of 400 to 800 microradians after the laser was turned on. This beam pointing variation is not acceptable in most laser material process working applications. It was determined by both analytical and experimental investigations that the pointing variation caused by changes in the cavity's length with temperature was approximately 30 microradians per degree C. This laser beam deflection caused by changes in the cavity's length with temperature was minor in comparison with the three thermal effects causing changes in the mirror's radius of curvature mentioned earlier; namely, temperature gradient between the mirrors front and back surfaces; the thermal expansion of the copper changing the mirror's curvature and the bimetallic effect with temperature changes between aluminum and copper.

The largest contribution to the beam pointing variations with temperature was due to the bimetallic effect between the large aluminum base plate and the copper mirror mounted on the base plate. The laser beam deflection due to the bimetallic effects between copper and aluminum in the assembly shown in FIG. 1 was found to be approximately 220 microradians per degree C. Of most importance, it was discovered that the bimetallic effect can be made to compensate for the changes in beam deflection caused by the changes in mirror radius of curvature by the changes in thermal gradient of the mirrors and by the thermal expansion between the copper and the aluminum.

It is important to note that the use of a bimetallic effect mirror structure to reduce changes in mirror radius of curvature with temperature in unstable optical resonators has wider applications than is the focus of this disclosure, which is the reduction of $CO_2$ slab laser output beams deflection as a function of temperature changes caused by changes in laser power output, operational duty cycle, pulse repetition frequency, etc.

Figure 3A:
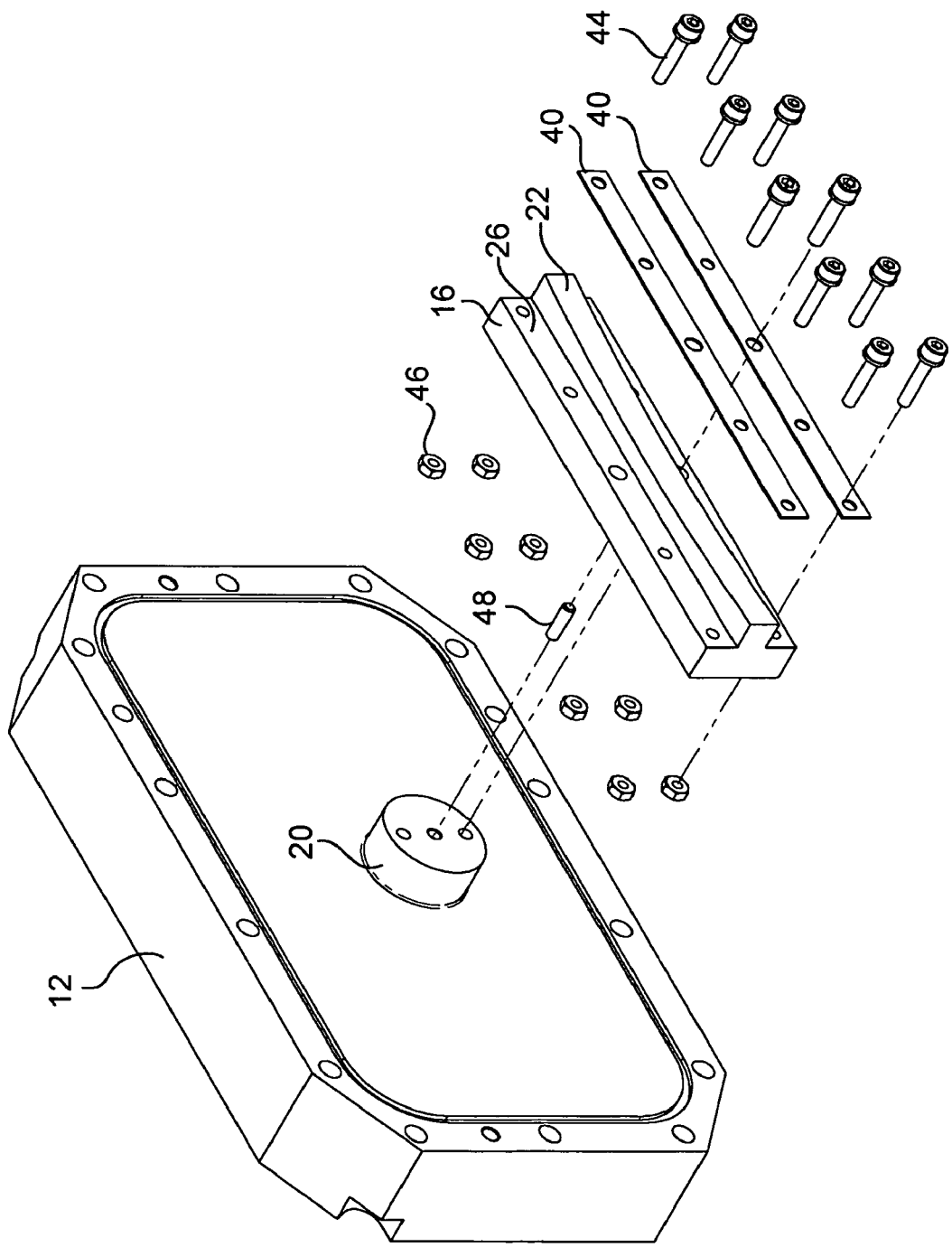
FIG. 3A is an exploded perspective view of a header and mirror assembly formed in accordance with the subject invention.
Figure 3B:
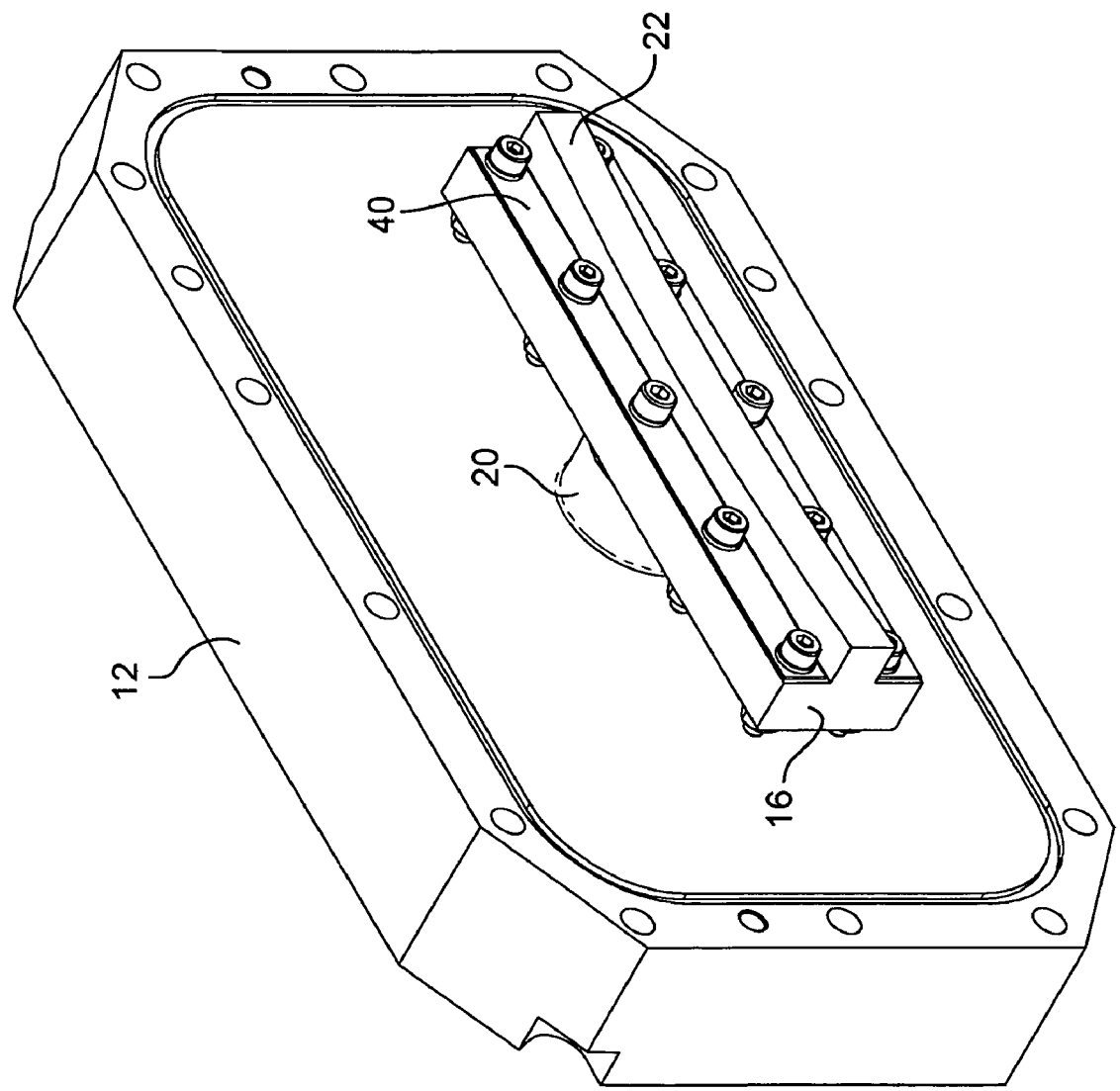
FIG. 3B is an assembled perspective view of the header of FIG. 3A.

FIGS. 3A and 3B illustrate a preferred approach for reducing variations in pointing due to heating of the mirrors. As discussed below, there were two significant changes made to the design of FIGS. 1 and 2. First, the large aluminum base 18 was eliminated. Second, a pair of stainless steel strips 40 are attached to the planar surfaces 26 of the mirror 16. The stainless steel strips function to limit the warping of the mirror due to differential heating.

In our experiments, the strips 40 were formed 17-4PH stainless steel. Each of the stainless steel strips is attached to the copper T-shaped mirror by retaining screws 44 and held in place by hex nuts 46. The T-shaped mirror and stainless steel strips assembly is attached to the raised surface 20 by two mounting screws (not show). A dowel pin 48 is used to align the mirror with the two threaded mounting holes.

The raised surface 20 is connected to the two axis, angular adjustable post as seen in FIG. 2. The post is used to adjust the mirror external to the hermetically sealed laser tube housing chamber.

The elimination of the aluminum base plate 18 of FIGS. 1 and 2 and attaching the center of the "T" shaped mirror directly onto the raised surface 20 of the two axis angularly adjustable post as shown in FIGS. 3A and 3B provided a large improvement in the pointing variation of the output laser beam with temperature by eliminating the bimetallic effect between the aluminum base plate and the copper mirror. The bimetallic effect between the stainless steel strips 40 attached to the front of the T-shaped copper mirror was able to compensate for the remaining beam pointing variation with temperature. The flange mirror assembly 12 is then attached to a laser tube housing (such as described in references cited above).

The thickness and length of the stainless steel strips are selected based on the dimensions of the T-shaped copper mirror and originally adjusted by analyses and experimentation until the desired amount of thermal compensation is obtained over a desired temperature range. Stainless steel strips have been discussed in this disclosure but other materials are also possible candidates without detracting from the invention. The only requirement is that the coefficient of thermal expansion of the strips be less than that of the material forming the mirror. In this way, the bimetallic effect can compensate for the warping created by differential heating of the mirror.

Figure 4A:
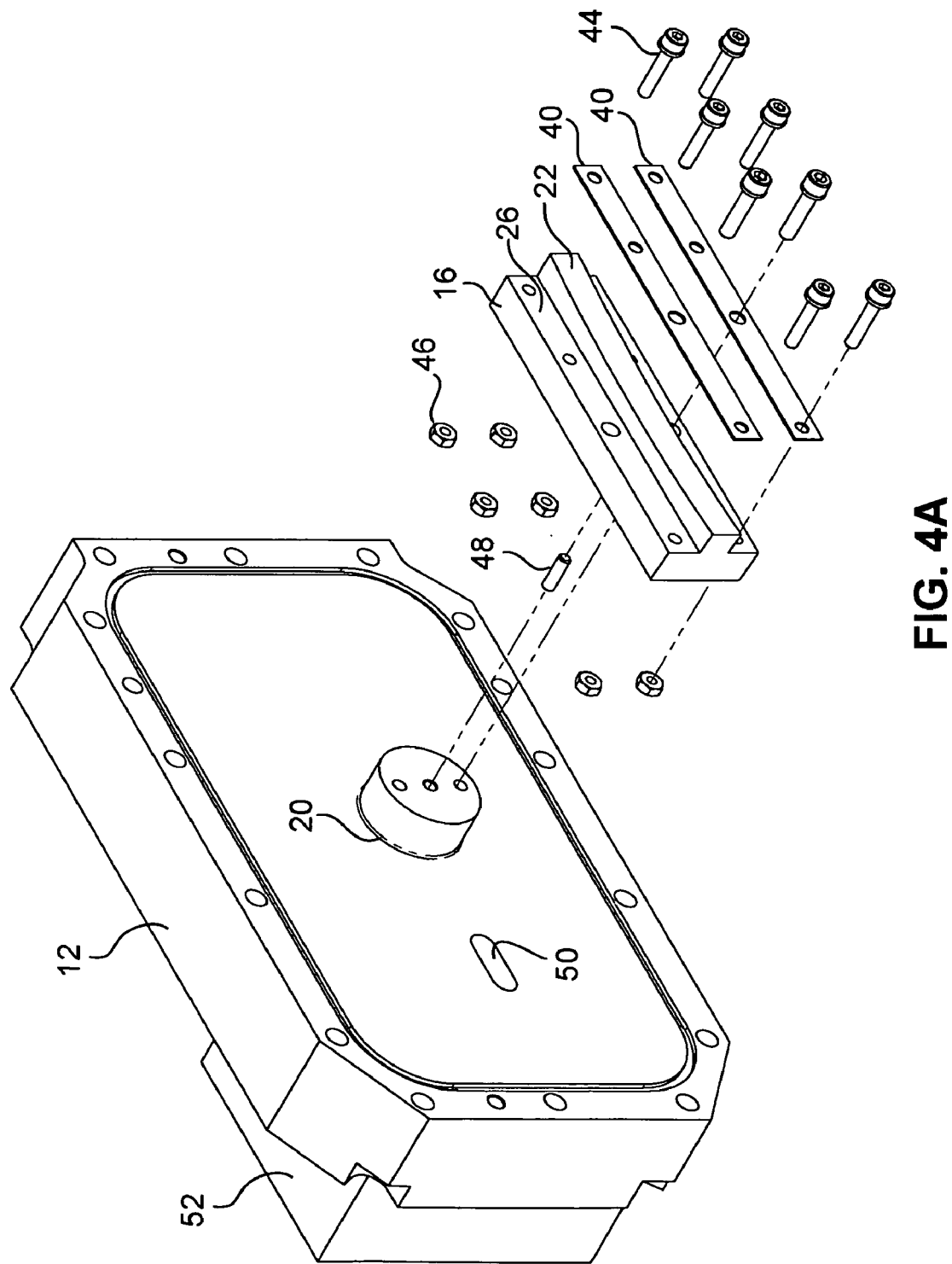
FIG. 4A is an exploded perspective view of a header and mirror assembly formed in accordance with the subject invention to be used on the output coupler side of the discharge.
Figure 4B:
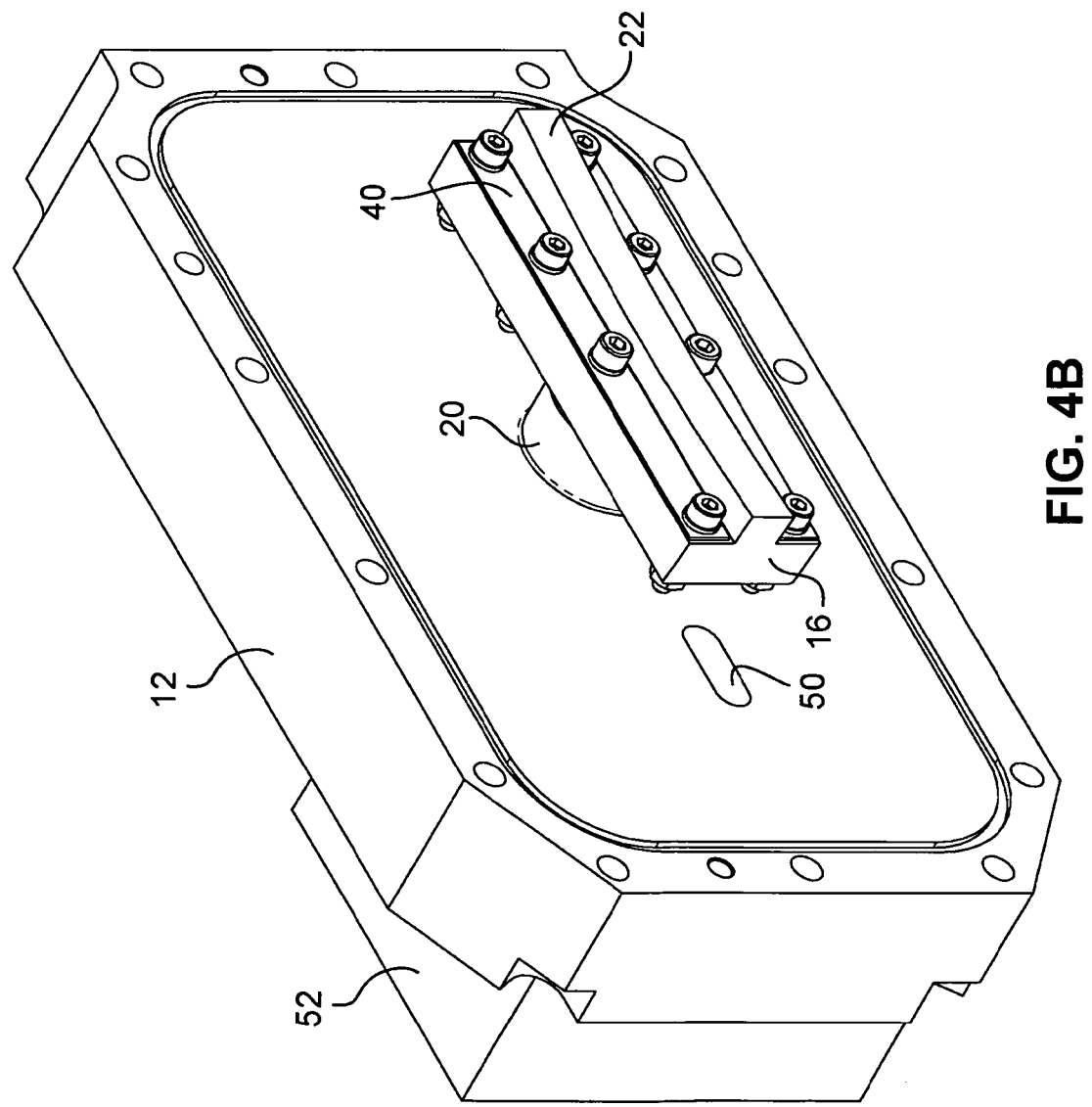
FIG. 4B is an assembled perspective view of the header of FIG. 4A.

FIGS. 4A and 4B are illustrations similar to FIGS. 3A and 3B but show the output coupler side of the laser. The major difference is the addition of output port 50 through which the laser beam exits the laser tube housing. A holder 52 is provided for carrying an output window (not shown) formed from materials such as a ZnSe or Si. The window holder 52 is designed to maintain the hermetical seal. It should be noted that the length of the mirror 26 is shorter for the output side due to the need of providing an output beam coupling port for the resonator.

The amount of output coupling from the negative branch hybrid unstable waveguide resonator is determined by the magnification of the resonator as is well known in the art.

An alternate and preferred approach for holding the two bimetallic materials together, such as the copper and stainless steel example discussed in this disclosure, is to bond the two materials together by either a soldering, or brazing technique instead of using the mechanical compression technique discussed above. The bonding approach initially requires more development efforts than the mechanical compression approach, but it can offer more long term stability especially after the laser tube housing undergoes temperature cycling experienced in bake-out during the manufacturing cycle.

Figure 5:
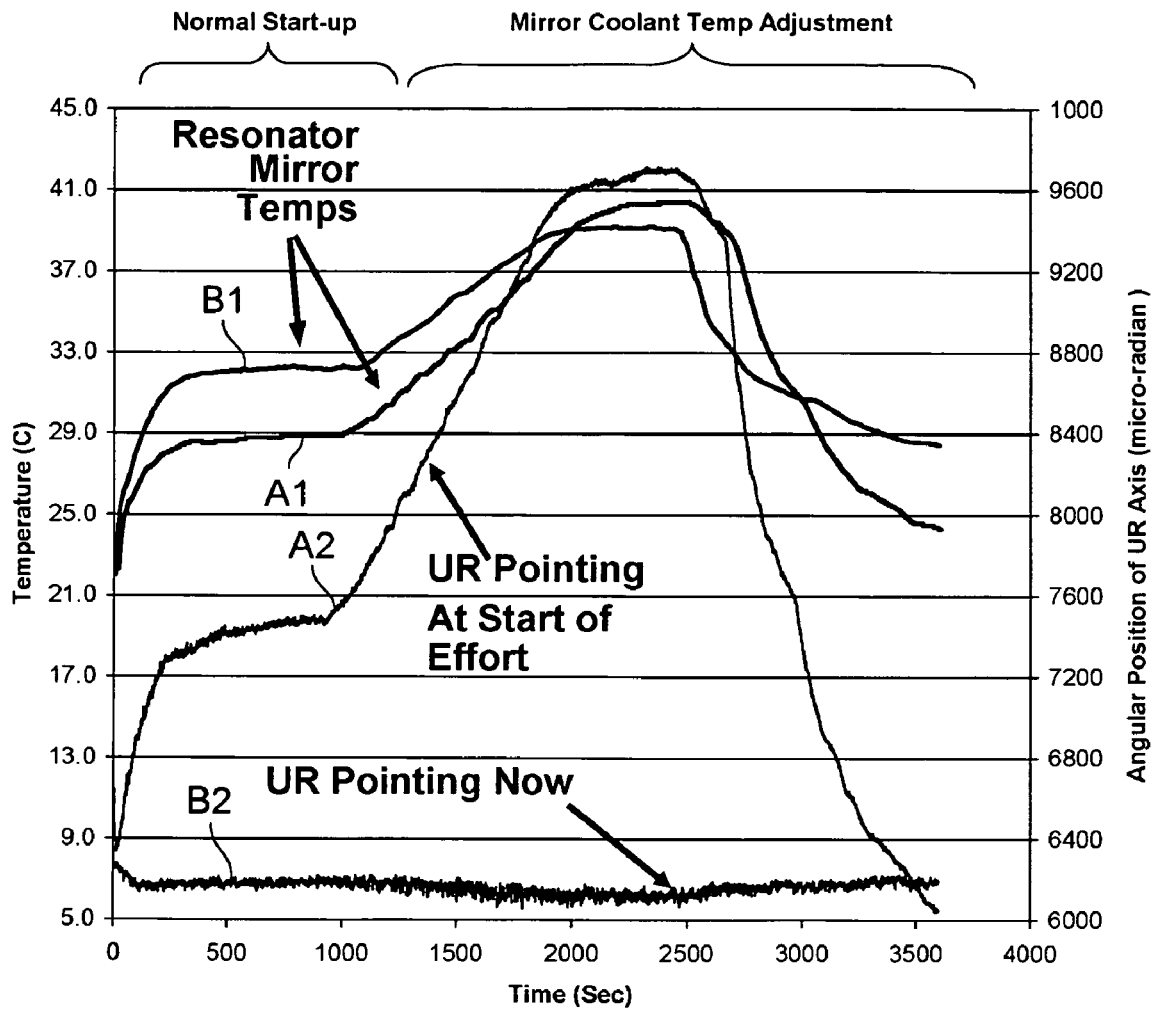
FIG. 5 is a graph illustrating the improvement in pointing stability based on use of the subject invention in a test laser.

FIG. 5 is a graph illustrating some beam pointing variation data from two lasers, one with and the other without bimetallic thermal compensation. The curves labeled A correspond to a laser having the prior art construction of FIGS. 1 and 2. The curves labeled B correspond to a laser design in accordance with FIGS. 3 and 4. FIG. 5 shows temperature variations of the laser's mirrors over time as varied by a temperature controlled coolant applied to the mirrors. FIG. 5 also shows the beam pointing variation of the unstable resonator (UR) with time that corresponds to the mirror temperature variation at that time by the coolant. Both lasers had the same output power of 400 W and were as described above.

At time t=0, the prior art laser is turned on and its mirror temperature starts to rise from 22° C. to approximately 29° C. in approximately 1000 seconds (curve A1). This time is the normal laser start-up temperature rise time for the laser mirrors. During this start-up time the angular position of the output beam of the prior art laser (curve A2) changed by approximately 1200 microradians (i.e., from 6300 to 7500 microradians). After 1000 seconds the mirror temperature of the prior art laser was raised by the controlled coolant so that at approximately 1500 seconds later (i.e., time≦2500 seconds), the laser mirror temperature was approximately 40° C. At a mirror temperature of approximately 40° C., the laser beam position was approximately 9500 microradians for a change in position by 2000 microradians. After 2500 sec, the mirror temperature was dropped to approximately 25° C. which caused the beam's pointing position to drop to approximately 6100 microradians (i.e., a change in angular position of approximately 3,400 microradians). This behavior is certainly not acceptable for most material working applications.

At time t=0, the laser formed in accordance with the subject invention (which was equal to the prior art laser in terms of power output), was turned on and then its mirror starts to rise in temperature from 22° C. to approximately 32° C. a little past 1000 seconds later (curve B1). During this start-up time the angular position of the output beam dropped from 6300 microradians to approximately 6100 microradians (curve B2) i.e., a change of only approximately 100 microradians. This represents over an order of magnitude improvement. There is an even greater improvement in beam pointing stability as the mirror temperature was raised to 40° C. and then dropped to approximately 6° C. The pointing stability shown in FIG. 5 is acceptable for most material processing applications. A comparison of the prior art laser deflection behavior with that of a laser formed in accordance with the subject invention clearly indicates the improvement obtained with the bimetallic thermal compensation of the unstable resonator mirrors. For example, the pointing stability at start up has been reduced from about one milliradians to about 100 microradians.

Figure 6A:
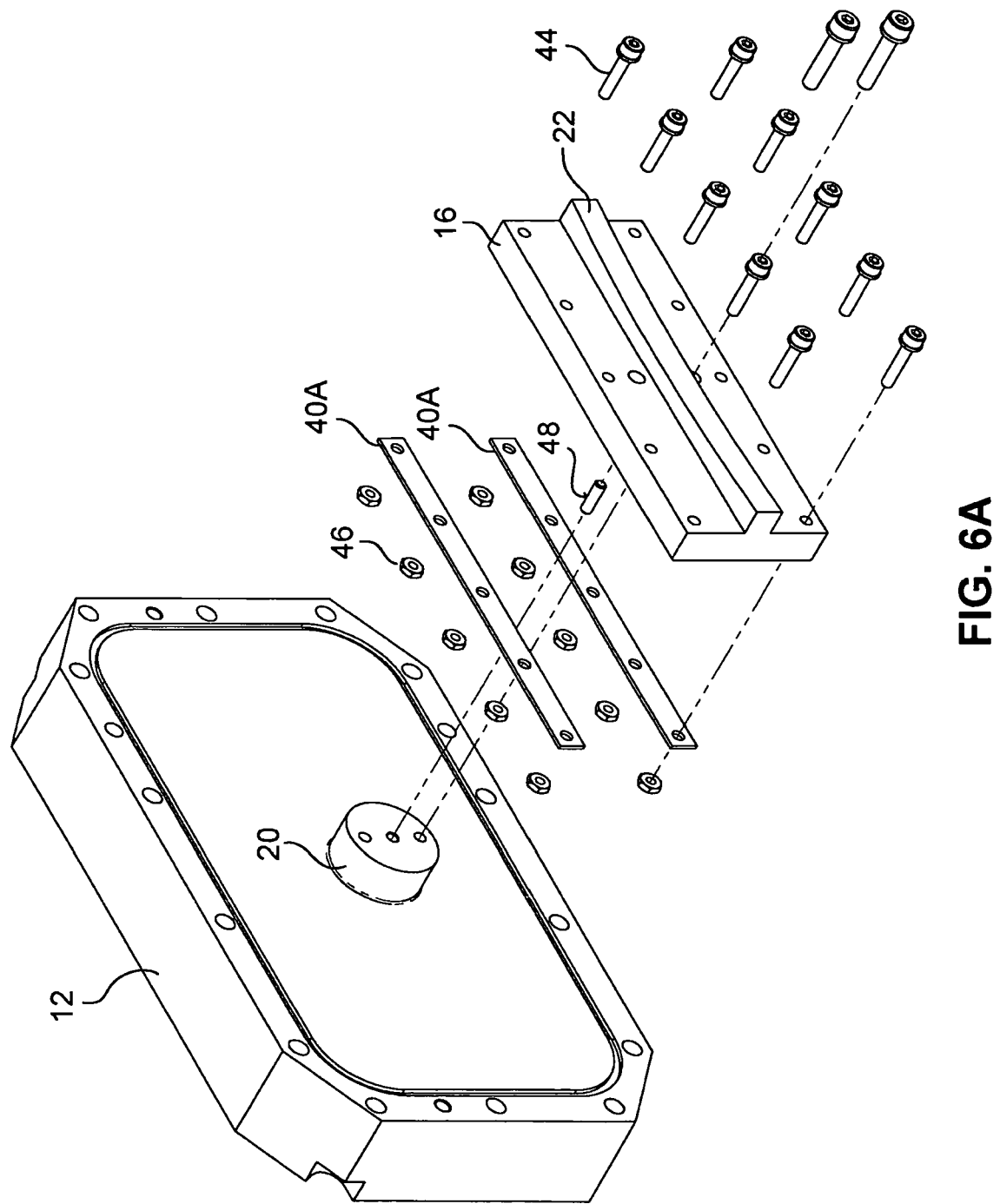
FIG. 6A is an exploded perspective view of a header and mirror assembly formed in accordance with a second embodiment of the subject invention.
Figure 6B:
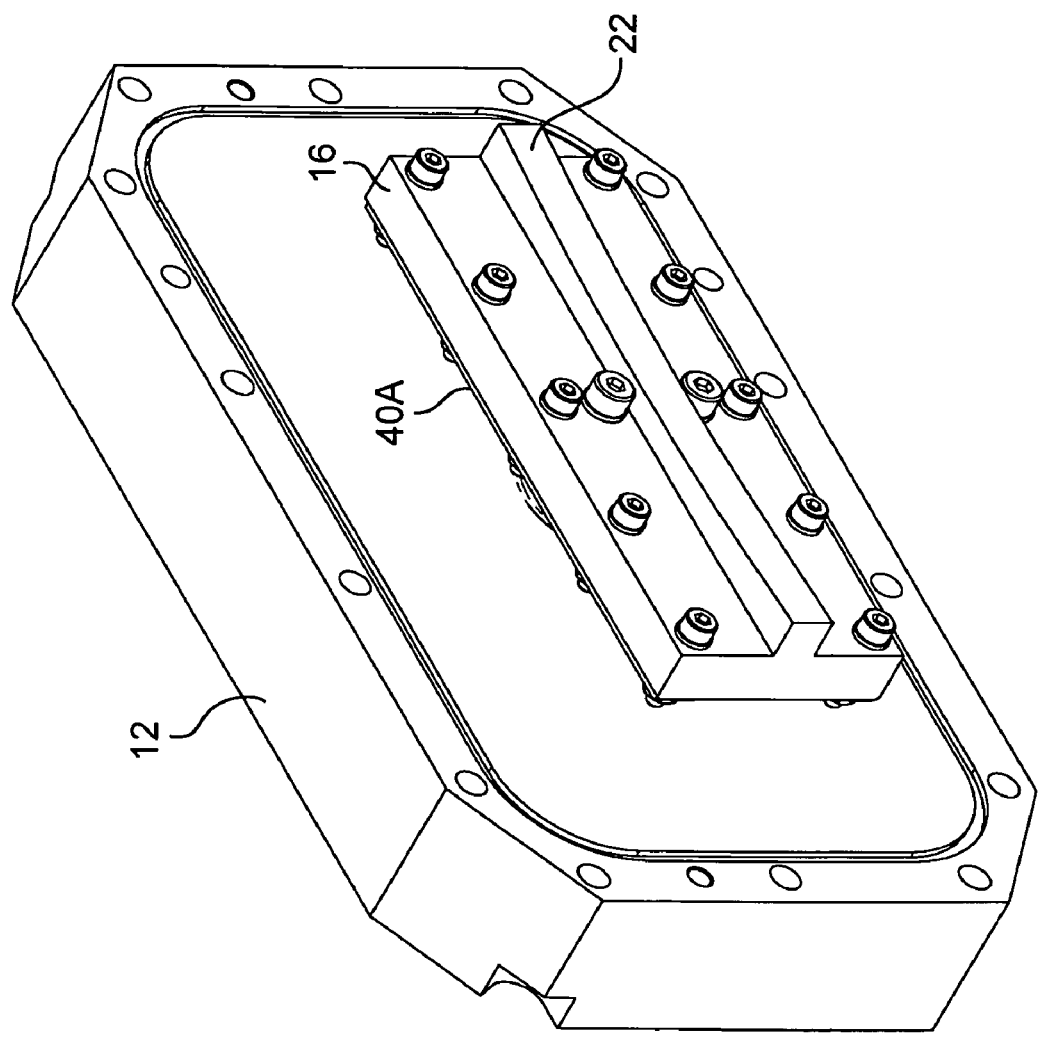
FIG. 6B is an assembled perspective view of the header of FIG. 6A.

FIGS. 6A and 6B illustrate an alternative approach. The embodiment of FIGS. 6A and 6B is the same as the embodiment of FIGS. 3A and 3B except that the strips 40A for controlling mirror warping are positioned on the rear surface of mirror element 16 instead of on the front surface. In this case, the coefficient of thermal expansion of the strips 40A should be greater than the coefficient of thermal expansion of the mirror element. In this manner, the bimetallic effect will tend to make the mirror more concave while the thermal gradient tends to make the mirror less concave. By properly selecting the thickness and width of the strips 40A, the two effects can be balanced so that the pointing stability can be improved.

Although two strips 40A are shown, any number (one or more) could be used. In the illustrated embodiment, the width of mirror element 16 (vertical dimension of FIG. 6A) is larger than as shown in FIG. 3A to permit a pair of strips 40A to be mounted on the rear surface of the mirror element while providing clearance of the center mount 48.

In the case of a copper mirror element, the strips can be formed from aluminum. It is noted that the prior art design included a large aluminum block 18 (FIG. 1) mounted to the rear surface of the mirror element. This large block produced a large and uncontrolled bimetallic effect. In contrast, and as noted above, the dimensions of the strips can be selected to balance the thermal gradient effect and improve performance.

While it is believed preferable to mount the strips on either the front surface of the mirror element (FIGS. 3 and 4) or the rear surface of the mirror element (FIG. 6), it may also be possible to mount strips along the side edges thereof.

While the subject invention has been described with reference to a preferred embodiment, various changes and modifications could be made therein, by one skilled in the art, without varying from the scope and spirit of the subject invention as defined by the appended claims.

We claim:

1. A header assembly for supporting an end mirror in a gas discharge laser comprising:

a flange including an inner surface facing the discharge and an opposed outer surface, said flange including a mirror support, said mirror support including a post on the inner surface of the flange for attachment to a mirror element, said mirror support further including a mirror tilt adjustment mechanism on the outer surface of the flange;

an elongated mirror element formed substantially from a metal material and attached to the post of the mirror support at the rear surface of the mirror element and with the front surface of the mirror element including an elongated curved reflecting portion for controlling light propagation, said front surface further including at least one planar surface extending parallel to the curved portion; and an elongated strip connected to said planar surface of said mirror element, said strip being formed from a metal material having a coefficient of thermal expansion less than that of the metal material forming the mirror element.

2. An assembly as recited in claim 1, wherein the mirror element is formed primarily from copper and the strip is formed primarily from stainless steel.

3. An assembly as recited in claim 1, wherein the strip is bolted to the mirror element.

4. An assembly as recited in claims 1, wherein the strip is bonded to the mirror element.

5. An assembly as recited in claim 1, wherein said planar surface is stepped down away from the curved surface in a direction away from the discharge.

6. An assembly as recited in claim 1, wherein the mirror element includes a second planar surface extending parallel to the curved portion and positioned on a side of the curved surface opposite said at least one planar surface and wherein said assembly further includes a second elongated metal strip connected to said second planar surface, said second strip being formed from a metal material having a coefficient of thermal expansion less than that of the metal material forming the mirror element.

7. An assembly as recited in claim 6, wherein said planar surfaces are stepped down from the curved portion in a direction away from the discharge.

8. An assembly as recited in claim 1, wherein said curved portion is concave in shape.

9. A header assembly for supporting an end mirror in a gas discharge laser comprising:

a flange including an inner surface facing the discharge and an opposed outer surface, said flange including a mirror support, said mirror support including a post on the inner surface of the flange for attachment to a mirror element, said mirror support further including a mirror tilt adjustment mechanism on the outer surface of the flange;

an elongated mirror element formed substantially from a metal material and attached to the post of the mirror support at the rear surface of the mirror element and with the front surface of the mirror element including an elongated concave reflecting portion for controlling light propagation, said front surface further including a pair of planar surface extending parallel to the curved portion on either side thereof, said planar surfaces being stepped down from the curved portion in a direction away from the discharge; and an elongated strip connected to each of said planar surfaces of said mirror element, said strips being formed from a metal material having a coefficient of thermal expansion less than that of the metal material forming the mirror element.

10. An assembly as recited in claim 9, wherein the mirror element is formed primarily from copper and the strips are formed primarily from stainless steel.

11. An assembly as recited in claim 9, wherein the strips are bolted to the mirror element.

12. An assembly as recited in claims 9, wherein the strips are bonded to the mirror element.

13. A header assembly for supporting an end mirror in a gas discharge laser comprising:

a flange including an inner surface facing the discharge and an opposed outer surface, said flange including a mirror support, said mirror support including a post on the inner surface of the flange for attachment to a mirror element, said mirror support further including a mirror tilt adjustment mechanism on the outer surface of the flange;

an elongated mirror element formed substantially from a metal material and attached to the post of the mirror support at the rear surface of the mirror element and with the front surface of the mirror element including an elongated curved reflecting portion for controlling light propagation; and an elongated strip connected to the rear surface of said mirror element, said strip being formed from a metal material having a coefficient of thermal expansion greater than that of the metal material forming the mirror element.

14. An assembly as recited in claim 13, wherein the mirror element is formed primarily from copper and the strip is formed primarily from aluminum.

15. An assembly as recited in claim 13, wherein the strip is bolted to the mirror element.

16. An assembly as recited in claims 13, wherein the strip is bonded to the mirror element.

17. An assembly as recited in claim 13, wherein a pair of strips are connected to the rear surface of the mirror, said pair of strips extending parallel to each other and positioned on either side of the post.

18. A header assembly for supporting an end mirror in a gas discharge laser comprising:

a flange including an inner surface facing the discharge and an opposed outer surface, said flange including a mirror support, said mirror support including a post on the inner surface of the flange for attachment to a mirror element, said mirror support further including a mirror tilt adjustment mechanism on the outer surface of the flange;

an elongated mirror element formed substantially from a metal material and attached to the post of the mirror support at the rear surface of the mirror element and with the front surface of the mirror element including an elongated curved reflecting portion for controlling light propagation; and an elongated strip connected to said mirror element, said strip being formed from a metal material and wherein the location of the strip and the coefficient of thermal expansion thereof being selected to compensate for the warping of the mirror caused by a thermal gradient induced with interaction of the mirror with a laser beam.

19. An assembly as recited in claim 18, wherein the front surface of the mirror element includes at least one planar surface extending parallel to the curved portion and wherein the strip is mounted to said planar surface and wherein the strip has a coefficient of thermal expansion less than that of the metal material forming the mirror element.

20. An assembly as recited in claim 18, wherein strip is connected to the rear surface of said mirror element and wherein the strip has a coefficient of thermal expansion greater than that of the metal material forming the mirror element.

* * * * *